(12) United States Patent
Creech

(10) Patent No.: US 6,178,322 B1
(45) Date of Patent: Jan. 23, 2001

(54) MESSAGE WAITING NOTIFICATION USING ANSI-41 NETWORK MESSAGING PROTOCOLS

(75) Inventor: Ross Clinton Creech, Allen, TX (US)

(73) Assignee: Northern Telecom Limited, Montreal (CA)

(*) Notice: Under 35 U.S.C. 154(b), the term of this patent shall be extended for 0 days.

(21) Appl. No.: 09/189,456

(22) Filed: Nov. 10, 1998

(51) Int. Cl.[7] ................................................. H04M 11/10
(52) U.S. Cl. ........................ 455/412; 455/413; 455/414; 455/433
(58) Field of Search .................... 455/412–413, 455/414, 433

(56) References Cited

U.S. PATENT DOCUMENTS

| | | | |
|---|---|---|---|
| 5,918,177 | * 6/1999 | Corriveau et al. | 455/432 |
| 5,991,633 | * 11/1999 | Corriveau et al. | 455/466 |
| 6,055,423 | * 4/2000 | Calabrese et al. | 455/412 |
| 6,070,080 | * 5/2000 | Madour et al. | 455/458 |
| 6,081,705 | * 6/2000 | Houde et al. | 455/411 |

OTHER PUBLICATIONS

D. Larson et al., Simple Mechanism to Update the Message Waiting Notification Count at the HLR and the Serving MSC (stage 2), Oct., 1998, pp. 1–5.

D. Larson et al., Simple Mechanism to Update the Message Waiting Notification Count at the HLR and the Serving MSC (stage 3), Oct., 19988, pp. 1–4.

Paul Reddy & Terry Watts, Message Waiting Notification from SN (Service Node)/ VMS (Voice Mail System) to HLR (home location register), Oct., 1997, pp. 1–27.

\* cited by examiner

*Primary Examiner*—Curtis A. Kuntz
*Assistant Examiner*—Barry W. Taylor
(74) *Attorney, Agent, or Firm*—Haynes and Boone, LLP

(57) ABSTRACT

A new ANSI-41 networking message, designated "MessageWaitingNotificationDirective" or "MWNDIR," for communicating message waiting notification information to an HLR is described. In a preferred embodiment, the MWNDIR message comprises several existing ANSI-41 parameters, including MobileStationIdentity ("MSID"), MobileDirectoryNumber ("MDN"), and MessageWaitingNotificationCount ("MWNCOUNT"). In operation, when the HLR receives an MWNDIR INVOKE message from a node, if the received message can be processed, the target Mobile Station ("MS") can be identified, and the target MS subscribes to a Message Waiting Notification ("MWN") service, the HLR stores the message waiting information received in the MWNCOUNT parameter and returns an empty parameter list (referred to as MWNDIR RETURN RESULT) to the node. Otherwise, the HLR sends a TCAP RETURN ERROR or TCAP REJECT with a proper Error or Problem Code to the node.

27 Claims, 2 Drawing Sheets

| MessageWaitingNotificationDirective INVOKE Parameters ||||||
|---|---|---|---|---|
| FIELD | VALUE | TYPE | REFERENCE | NOTES |
| IDENTIFIER | SET [NATIONAL 18] | M | 6.3.2.1 | |
| LENGTH | VARIABLE OCTETS | M | 6.3.2.1 | |
| CONTENTS |||||
| MobileStationIdentity | | O | 6.5.2.6V | A,B |
| MobileDirectoryNumber | | O | 6.5.2.60 | A,B |
| MessageWaitingNotificationCount | | O | 6.5.2.78 | C |

200 → (table)
202 → MobileStationIdentity
204 → MobileDirectoryNumber
206 → MessageWaitingNotificationCount NOTES:
A. INCLUDE TO IDENTIFY THE MOBILE SUBSCRIBER.
B. ONE OF THESE PARAMETERS MUST BE INCLUDED IN EACH INSTANCE OF THE MESSAGE.
C. INCLUDE TO IDENTIFY THE TYPE AND NUMBER OF MESSAGES WAITING.

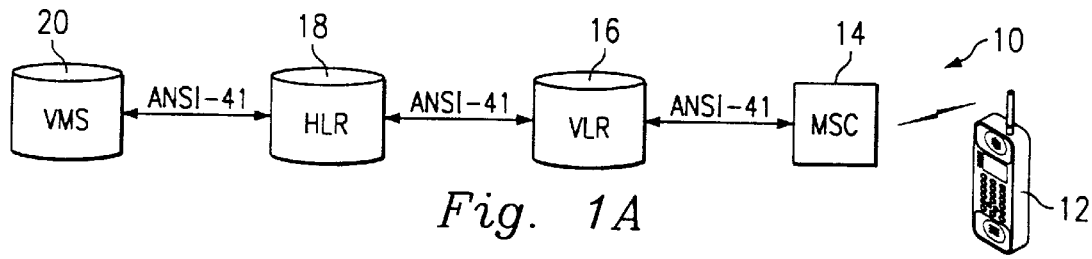

Fig. 1A

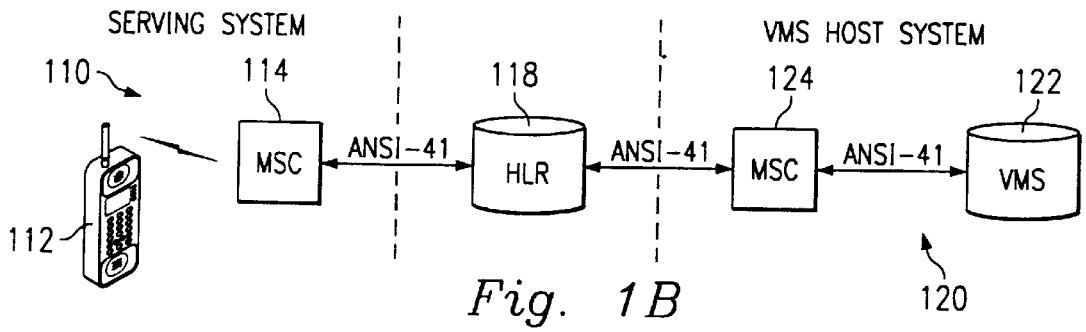

Fig. 1B

| MessageWaitingNotificationDirective INVOKE Parameters | | | | |
|---|---|---|---|---|
| FIELD | VALUE | TYPE | REFERENCE | NOTES |
| IDENTIFIER | SET [NATIONAL 18] | M | 6.3.2.1 | |
| LENGTH | VARIABLE OCTETS | M | 6.3.2.1 | |
| CONTENTS | | | | |
| MobileStationIdentity | O | | 6.5.2.6V | A,B |
| MobileDirectoryNumber | O | | 6.5.2.60 | A,B |
| MessageWaitingNotificationCount | O | | 6.5.2.78 | C |

NOTES:
A. INCLUDE TO IDENTIFY THE MOBILE SUBSCRIBER.
B. ONE OF THESE PARAMETERS MUST BE INCLUDED IN EACH INSTANCE OF THE MESSAGE.
C. INCLUDE TO IDENTIFY THE TYPE AND NUMBER OF MESSAGES WAITING.

Fig. 2A

| MessageWaitingNotificationDirective RETURN RESULT Parameters | | | | |
|---|---|---|---|---|
| FIELD | VALUE | TYPE | REFERENCE | NOTES |
| IDENTIFIER | SET [NATIONAL 18] | M | 6.3.2.2 | |
| LENGTH | ZERO OCTETS | M | 6.3.2.2 | |
| CONTENTS | | | | |

Fig. 2B

MESSAGE WAITING NOTIFICATION USING ANSI-41 NETWORK MESSAGING PROTOCOLS

TECHNICAL FIELD

The invention relates generally to ANSI-41 network messaging protocols and, more particularly, to an ANSI-41 networking message to communicate message waiting notification information from a separate node to a Home Location Register ("HLR") in a wireless communications network.

BACKGROUND OF THE INVENTION

A standard known as ANSI/TIA/EIA-41, Cellular Radiocommumications Intersystem Operations (hereinafter "ANSI-41"), defines how various nodes in a wireless communications network, including a Home Location Register ("HLR"), a Visiting Location Register ("VLR"), a Mobile Switching Center ("MSC") and a Message Center ("MC"), communicate with one another. Specifically, ANSI-41 defines what messages can be sent back and forth between the nodes and the contents of those messages.

The Message Waiting Notification ("MWN") service provides the functionality of informing a Mobile Station ("MS") of messages waiting in a mailbox. This service can be provided in one of two ways, including Message Waiting Indication ("MWI") and Message Waiting Tone ("MWT"). The MWI capability provides a visual indication of any messages waiting. For example, a lamp on the MS is turned on when messages are waiting in the subscriber's mailbox and is turned off when the messages are retrieved or if no messages are waiting. Optionally, the actual number of messages waiting can be shown on the display of the MS handset. This is accomplished by sending the ANSI-41 parameters MessageWaitingNotificationType ("MWNTYPE") and MessageWaitingNotificationCount ("MWNCOUNT") in the profile messages from the HLR to the MSC/VLR. Profile messages include regnot return result, qualreq return result, and QUALDIR INVOKE. The MWT capability provides the functionality of informing the MS of messages waiting in a mailbox by means of a tone at the beginning of call originations and terminations.

A subscriber's MWT and MWI capabilities are stored as part of the subscribers's profile in the HLR.

Currently, ANSI-41 contains detailed standards for communicating Message Waiting Notification ("MWN") information, including message type (e.g., voice or text) and message count, from the HLR to the MSC/VLR, but not from separate node, for example, a Service Node ("SN"), a Message Center ("MC"), a Voice Mail System ("VMS"), or an MSC where the VMS is hosted off the MSC, to the HLR. As used herein, the term "separate node"or "node" refers to either a separate node or a separate entity residing on the same node, such as in a case where the HLR, MSC, and VMS are co-located at the same node.

A standard known as the Simplified Message Desk Interface ("SMDI") is the only standard that defines the communication of MWN information to the HLR. SMDI suffers certain limitations, in that does not use ANSI-41 protocols and that it only supports one message type (voice) and does not support a message count.

Another "solution" has been to modify an existing ANSI-41 networking message known as the SMSREQ ("Short Message Service Request") message, which is typically sent by an MC to an HLR to request the MS's current SMS ("Short Message Service") routing address in order to send an SMS message directly to the MSC currently serving the MS. Using this message to communicate Message Waiting Notification ("MWN") information is done solely for convenience, since the message already exists between the MC and HLR; however, it is intended for SMS only, not the MWN service. Additionally, it does not make sense for an SMS message to be sent between a VMS and an HLR when SMS is not supported on the VMS. Moreover, it is typical, according to ANSI-41 naming conventions, for messages used to request information to end in "REQ", while messages used to direct a node to perform a task end in "DIR". Accordingly, using the SMSREQ message, which is a "request" message and, as such, is intended to request information, to provide information violates such naming conventions.

Therefore, what is needed is a message that utilizes existing ANSI-41 parameters to communicate MWN information, including multiple message types and a message count, from a separate node to the HLR.

SUMMARY OF THE INVENTION

One embodiment of the invention, accordingly, is a new ANSI-41 networking message, designated "MessageWaitingNotificationDirective" or "MWNDIR," for communicating message waiting notification information to an HLR. In a preferred embodiment, the MWNDIR message comprises several existing or soon to exist ANSI-41 parameters (hereinafter collectively referred to as "existing ANSI-41 parameters" or "ANSI-41 parameters"), including MobileStationIdentity ("MSID") (as currently defined in TIA/EIA/IS-751 and to be included in an upcoming revision of ANSI-41), MobileDirectoryNumber ("MDN"), and MessageWaitingNotificationCount ("MWNCOUNT").

In operation, when the HLR receives an MWNDIR INVOKE message from a node, if the received message can be processed, the target mobile station identified, and the MS subscribes to an MWN service, the HLR stores the message waiting information received in the MWNCOUNT parameter and returns an empty parameter list (referred to as MWNDIR RETURN RESULT) to the node. Otherwise, the HLR sends a TCAP RETURN ERROR or a TCAP REJECT message with a proper Error or Problem Code to the node.

A technical advantage achieved with the invention is that it uses existing ANSI-41 parameters to communicate message waiting information from a separate node to an HLR in a wireless communications network.

Another technical advantage achieved with the invention is that it can communicate both message type and message count information from a separate node to an HLR in a wireless communications network.

BRIEF DESCRIPTION OF THE DRAWINGS

FIG. 1A is a system block diagram of a wireless communications network embodying features of the present invention.

FIG. 1B is a system block diagram of an alternative embodiment of a wireless communications network embodying features of the present invention.

FIG. 2A illustrates a MessageWaitingNotificationDirective INVOKE message of the present invention.

FIG. 2B illustrates a MessageWaitingNotificationDirective RETURN RESULT message of the present invention.

DESCRIPTION OF THE PREFERRED EMBODIMENT

Figure 3:
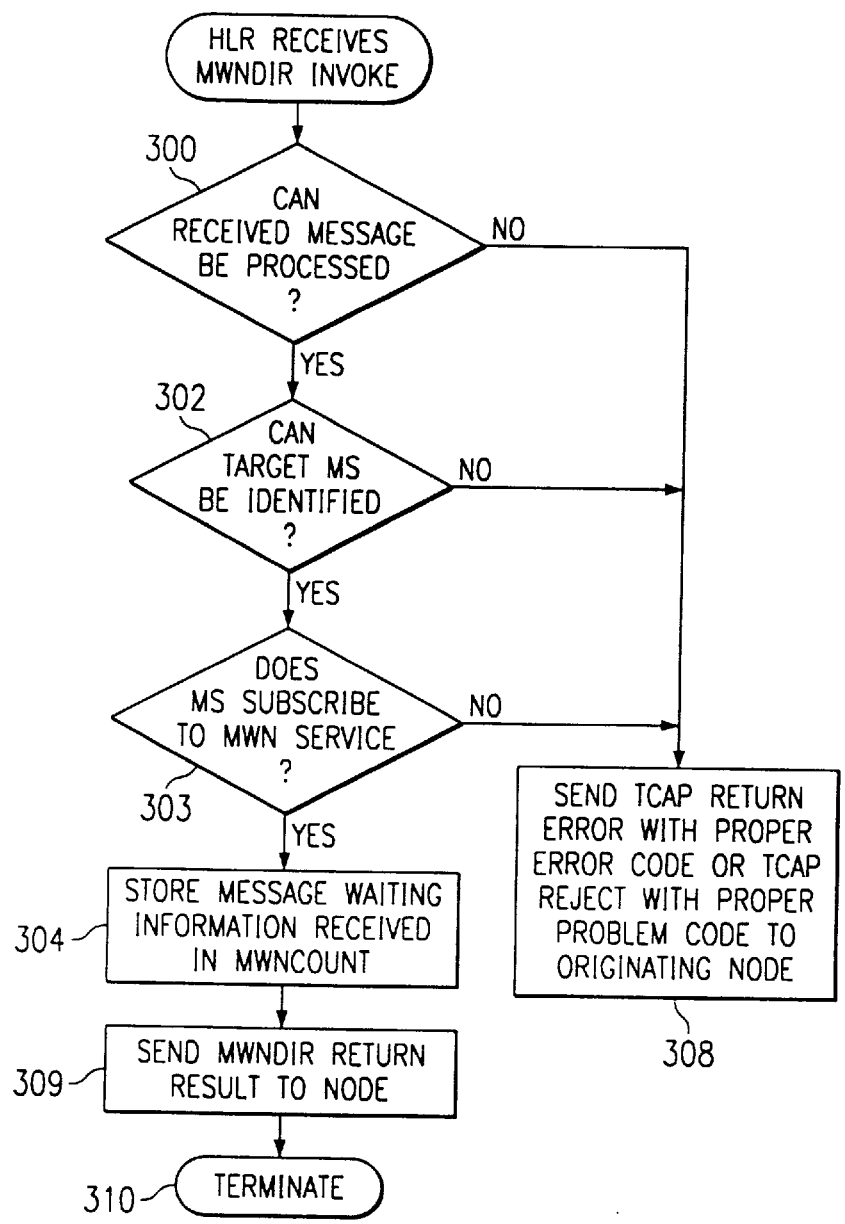
FIG. 3 is a flowchart illustrating the operation of a Home Location Register of the network of FIG. 1 upon receipt of a MessageWaitingNotificationDirective INVOKE message.

FIG. 1A is a system block diagram of a wireless communications network 10 embodying features of the present invention. As shown in FIG. 1A, a Mobile Station ("MS") 12 communicates via a wireless connection with a Mobile Switching Center ("MSC") 14 in a conventional fashion. The MSC communicates with a VLR 16, which in turn communicates with an HLR 18, using ANSI-41 network messaging protocols in a manner known to those skilled in the art. The HLR 18 communicates with a separate node 20, which in the illustrated embodiment is a Voice Mail System ("VMS"), but which could be any one of a number of different components, including, for example, a Service Node ("SN") or a Message Center ("MC"). The HLR 18 and node 20 communicate using ANSI-41 network messaging protocols in a manner that will be described in greater detail below.

FIG. 1B is a system block diagram of an alternative embodiment of a wireless communications network 110 embodying features of the present invention. As shown in FIG. 1B, a Mobile Station ("MS") 112 communicates via a wireless connection with a Mobile Switching Center ("MSC") 114 in a conventional fashion. The MSC 112 communicates with an HLR 118, using ANSI-41 network messaging protocols in a manner known to those skilled in the art. The HLR 118 communicates with a separate node 120, which in the illustrated embodiment comprises a Voice Mail System ("VMS") 122 hosted off of an MSC 124, which communicates with the HLR 118 using ANSI-41 network messaging protocols in a manner that will be described in greater detail below. It should be recognized that communication between the HLR 118 and the VMS 122 occurs in the same manner described below with respect to communication between the HLR 18 and VMS 20, except that messages are communicated first from the VMS 122 to the MSC 124 and then from the MSC 124 to the HLR 118.

Each of the components 14, 16, 18, and 20, of the network 10 and the components 114, 118, 122, and 124 of the network 110 operate in a conventional manner; therefore, the operation thereof will not be described in detail except as necessary to impart a complete understanding of the present invention.

FIG. 2A illustrates a MessageWaitingNotificationDirective INVOKE ("MWNDIR INVOKE") message 200 of the present invention. As previously indicated, the message 200 utilizes existing ANSI-41 parameters to communicate message waiting information from the node 20 to the HLR 18. Message counts for voice, SMS, and FAX G3 message types are supported. The MWNDIR operation is initiated with TCAP INVOKE (LAST). This is carried by a TCAP QUERY WITH PERMISSION package. The Parameter Set for the MWNDIR INVOKE message is encoded as shown in FIG. 2A.

Both a MobileStationIdentity ("MSID") parameter 202 (as currently defined in TIA/EIA/IS-751) and a MobileDirectoryNumber ("MDN") parameter 204 are included to identify the Mobile Station and one of these parameters 202, 204, must be included in each instance of the message 200. The MSID parameter 202 is not explicitly encoded; it can be either the MobileIdentificationNumber ("MIN") parameter or the InternationalMobileStationIdentity ("IMSI") parameter (currently defined in TIA/EIA/IS-751 and to be included in an upcoming revision of ANSI-41) supported by or soon to be supported by ANSI-41. The MessageWaitingNotificationCount ("MWNCOUNT") parameter 206 is included to indicate the type and number of messages waiting.

FIG. 2B illustrates a MessageWaitingNotificationDirective RETURN RESULT ("MWNDIR RETURN RESULT") message 210 of the present invention. It should be noted that the MWNDIR RETURN RESULT message 210 comprises an empty parameter list. The success of the MWNDIR operation is reported with TCAP RETURN RESULT (LAST). This is carried by a TCAP RESPONSE package. The Parameter Set for the MWNDIR RETURN RESULT message is encoded as shown in FIG. 2B.

FIG. 3 is a flowchart illustrating the operation of the HLR 18 upon receipt of an MWNDIR INVOKE message. In step 300, a determination is made whether the received message can be processed. If so, execution proceeds to step 302, in which a determination is made whether the target MS can be identified. If so, execution proceeds to step 303, in which a determination is made as to whether the MS subscribes to an MWN service. If so, execution proceeds to step 304, in which the message waiting information received in the MessageWaitingNotificationCount ("MWNCOUNT") parameter is stored.

If in step 300, the received message cannot be processed, if in step 302, the target MS cannot be identified, or if in step 303, it is determined that the MS does not subscribed to an MWN service, execution proceeds to step 308, in which a TCAP RETURN ERROR or TCAP REJECT message with a proper Error or Problem Code value is sent to the originating node. Examples of Error Codes resulting in the generation of a TCAP RETURN ERROR include "MIN/HLR Mismatch" or "Unrecognized MIN" when the MS cannot be identified, "Feature Inactive" when the MS does not subscribe to an MWN service, "Parameter Error" when parameter encoding errors are encountered, and "Missing Parameter" when an expected optional parameter is missing, such as when the MWNCOUNT parameter is not received. Examples of Problem Codes resulting in the generation of a TCAP REJECT message include "Incorrect Parameter" when mandatory parameters, such as MSID and MDN, are missing, "Badly Structured Component Portion" when the component portion of the message is improperly formatted, and "Badly Structured Transaction Portion" when the transaction portion of the message is improperly formatted.

Returning to step 304, once the message waiting information is stored, the HLR 18 sends an MWNDIR RETURN RESULT message to the node 20 in step 309. Execution terminates in step 310.

Figure 4:
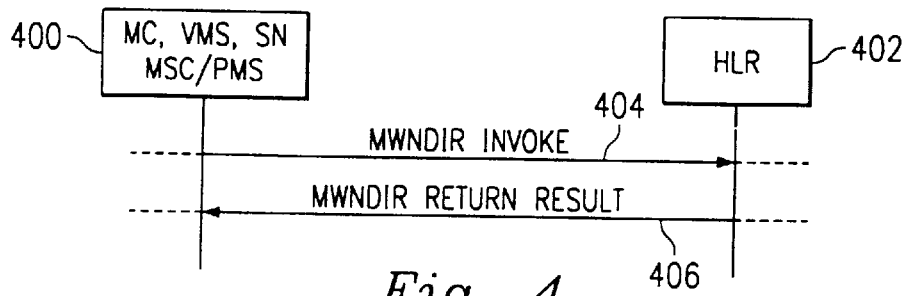
FIG. 4 illustrates the ANSI-41 messaging for updating message waiting information at a Home Location Register of the network of FIG. 1 in accordance with the present invention.

Referring now to FIG. 4, the ANSI-41 messaging to update message waiting information at an HLR, in accordance with the teachings of the present invention, will now be described. Initially, a node 400 sends an MWNDIR INVOKE message 200 (FIG. 2A) to an HLR 402 associated with a designated MS (not shown) to update that MS's message waiting information (i.e., type and number of messages waiting), as represented by an arrow 404. The MS is identified by either its Mobile Station Identity ("MSID") or its Mobile Directory Number ("MDN"). As previously indicated, the node 400 can include any node, such as an MC, a VMS, an SN, or even a VMS hosted off of an MSC.

The HLR 402 stores the received message waiting information, as described in connection with FIG. 3, and returns an MWNDIR RETURN RESULT message to the requesting node 400, as represented by an arrow 406. It should be noted that the Message Waiting Notification Service is already defined in ANSI-41 and begins when the HLR detects a change in the number of messages waiting.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of communicating message waiting notification information from a node to a Home Location Register ("HLR") in a wireless communications network, the method comprising the step of:

upon receipt of a MessageWaitingNotificationDirective INVOKE ("MWNDIR INVOKE") message from said node, determining whether said received MWNDIR INVOKE message can be processed;

if said received MWNDIR INVOKE message can be processed, determining whether a target mobile station can be identified and subscribes to a message waiting notification ("MWN") service;

if said target mobile station can be identified and subscribes to an MWN service, storing message waiting information received in said MWNDIR INVOKE message in a first parameter;

wherein said MWNDIR INVOKE message is processable when including only one ANSI-41 Parameter which identifies said target mobile station; and sending a MessageWaitingNotificationDirective RETURN RESULT ("MWNDIR RETURN RESULT") message to said node.

2. The method of claim 1 further comprising, if said received MWNDIR INVOKE message cannot be processed or if said target mobile station cannot be identified or does not subscribe to an MWN service, sending an error or reject message to said node.

3. The method of claim 1 wherein said MWNDIR INVOKE message comprises at least two ANSI-41 parameters, a first one of said at least two ANSI-41 parameters identifying said target mobile station and a second one of said at least two ANSI-41 parameters being a MessageWaitingNotificationCount ("MWNCOUNT") parameter.

4. The method of claim 3 wherein said first ANSI-41 parameter is a MobileStationIdentity ("MSID") parameter.

5. The method of claim 3 wherein said first ANSI-41 parameter is a MobileDirectoryNumber ("MDN") parameter.

6. The method of claim 1 wherein said MWNDIR RETURN RESULT message is comprised of an empty parameter list.

7. The method of claim 1 wherein said node comprises a node selected from the group consisting of a Service Node ("SN"), a Message Center ("MC"), a Voice Mail System ("VMS"), and a VMS hosted off of a Mobile Switching Center ("MSC").

8. A method of communicating message waiting notification information from a node to a Home Location Register ("HLR") in a wireless communications network using an ANSI-41 network messaging protocol, the method comprising the steps of:

upon receipt of a MessageWaitingNotificationDirective INVOKE ("MWNDIR INVOKE") message from said node, determining whether said received MWNDIR INVOKE message can be processed;

if said received MWNDIR INVOKE message can be processed, determining whether a target mobile station can be identified and subscribes to a message waiting notification ("MWN") service;

if said target mobile station can be identified and subscribes to an MWN service, storing message waiting information received in said MWNDIR INVOKE message in a first parameter; and sending a MessageWaitingNotificationDirective RETURN RESULT ("MWNDIR RETURN RESULT") message to said node;

wherein said MWNDIR INVOKE message comprises at least two ANSI-41 parameters and is processable, by said HLR when said at least two ANSI-41 parameters includes only one ANSI parameter used to identify said target mobile station.

9. The method of claim 8 further comprising, if said received MWNDIR INVOKE message cannot be processed or if said target mobile station cannot be identified or does not subscribe to an MWN service, sending an error or reject message to said node.

10. The method of claim 8 wherein one of said at least two ANSI-41 parameters is a MessageWaitingNotificationCount ("MWNCOUNT") parameter.

11. The method of claim 8 wherein one of said at least two ANSI-41 parameter is a MobileStationIdentity ("MSID") parameter.

12. The method of claim 8 wherein one of said at least two ANSI-41 parameters is a MobileDirectoryNumber ("MDN") parameter.

13. The method of claim 8 wherein said node comprises a node selected from the group consisting of a Service Node ("SN"), a Message Center ("MC"), a Voice Mail System ("VMS"), and a VMS hosted off of a Mobile Switching Center ("MSC").

14. A method of communicating message waiting notification information from a node to a Home Location Register ("HLR") in a wireless communications network using an ANSI-41 network messaging protocol, the method comprising the steps of:

upon receipt of a first message from said node, determining whether said received first message can be processed, said first message determined to be processable when containing less than two ANSI parameters used to identify a target mobile station;

if said received first message can be processed, determining whether said target mobile station can be identified and subscribes to a message waiting notification ("MWN") service;

if said target mobile station can be identified and subscribes to a MWN service, storing message waiting information received in said first message in a first parameter; and sending a second message to said node.

15. The method of claim 14 further comprising, if said received first message cannot be processed or if said target mobile station cannot be identified or does not subscribe to an MWN service, sending an error or reject message to said node.

16. The method of claim 14 wherein said second message comprises no ANSI-41 parameters.

17. The method of claim 14 wherein said node comprises a node selected from the group consisting of a Service Node ("SN"), a Message Center ("MC"), a Voice Mail System ("VMS"), and a VMS hosted off of a Mobile Switching Center ("MSC").

18. Apparatus for communicating message waiting notification information from a node to a Home Location Register ("HLR") in a wireless communications network, the method comprising:

means for determining whether a first message received at said HLR from said node can be processed, said determining means determining that said first message is processable when said first message contains only one ANSI parameter used to identify a target mobile station;

means responsive to a determination that said received first message can be processed for determining whether said target mobile station can be identified and subscribes to a message waiting notification ("MWN") service;

means responsive to a determination that said target mobile station can be identified and subscribes to an MWN service for storing message waiting information received in said first message in a first parameter; and means for sending a second message to said node.

19. The apparatus of claim 18 further comprising means responsive to a situation in which said received first message cannot be processed or if said target mobile station cannot be identified or does not subscribe to an MWN service for sending an error message to said node.

20. The apparatus of claim 18 wherein said first message comprises a MessageWaitingNotificationDirective INVOKE ("MWNDIR INVOKE") message.

21. The apparatus of claim 18 wherein said first message comprises at least two ANSI-41 parameters.

22. The apparatus of claim 21 wherein one of said at least two ANSI-41 parameters is a MessageWaitingNotificationCount ("MWNCOUNT") parameter.

23. The apparatus of claim 21 wherein one of said at least two ANSI-41 parameters is a MobileStationIdentity ("MSID") parameter.

24. The apparatus of claim 21 wherein one of said at least two ANSI-41 parameters is a MobileDirectoryNumber ("MDN") parameter.

25. The apparatus of claim 18 wherein said second message is a MessageWaitingNotificationDirective RETURN RESULT ("MWNDIR RETURN RESULT") comprising an empty parameter list.

26. The apparatus of claim 18 wherein said node comprises a node selected from the group consisting of a Service Node ("SN"), a Message Center ("MC"), a Voice Mail System ("VMS"), and a VMS hosted off of a Mobile Switching Center ("MSC").

27. The method of claim 14 wherein said first message comprises at least two ANSI-41 parameters, including a MessageWaitingNotificationCount ("MWNCOUNT") parameter and a MobileStationIdentity ("MSID") parameter or a MobileDirectoryNumber ("MDN") parameter.

* * * * *